United States Patent [19]

Tyson, II et al.

[11] Patent Number: 5,257,088
[45] Date of Patent: Oct. 26, 1993

[54] APPARATUS AND METHOD FOR NONDESTRUCTIVE INSPECTION OF A VEHICLE

[75] Inventors: John Tyson, II, Wayne; John W. Newman, Berwyn, both of Pa.

[73] Assignee: Laser Technology, Inc., Norristown, Pa.

[21] Appl. No.: 858,416

[22] Filed: Mar. 27, 1992

[51] Int. Cl.$^5$ .............................................. G01B 9/02
[52] U.S. Cl. ................................. 356/353; 356/35.5; 356/32; 356/345; 73/800; 73/802; 73/815; 244/125
[58] Field of Search .................. 356/353, 35.5, 32, 34; 73/800, 815, 802; 358/107; 244/118.1, 119, 125, 126

[56] References Cited

U.S. PATENT DOCUMENTS

| | | | |
|---|---|---|---|
| 4,682,892 | 7/1987 | Chawla | 356/35.5 |
| 4,887,899 | 12/1989 | Hung | 356/35.5 |
| 5,065,331 | 11/1991 | VaChon et al. | 356/35.5 |
| 5,082,366 | 1/1992 | Tyson, II et al. | 356/35.5 |
| 5,094,528 | 3/1992 | Tyson et al. | 356/35.5 |

Primary Examiner—Samuel A. Turner
Assistant Examiner—LaCharles P. Keesee
Attorney, Agent, or Firm—William H. Eilberg

[57] ABSTRACT

This invention tests a vehicle, such as an aircraft, using nondestructive interferometry. An interferometer detects movements in the vehicle surface due to stress. One applies such stress by pressurizing the vehicle. In one embodiment, a hood housing the interferometer attaches to the vehicle surface with the aid of a vacuum. One can vary the pressure in the vehicle in various ways, while monitoring the interferometer for signs of defects in the structure behind the surface. The invention also includes an arrangement for substantially automating the analysis. For example, one can automatically position the interferometer according to position information received from appropriate sensors, in combination with stored information about the structure of the vehicle. One preferably uses a real-time interferometer, such as an electronic shearography camera, in the present invention. One can quickly determine the location of defects by observing fringes on a video monitor.

32 Claims, 5 Drawing Sheets

APPARATUS AND METHOD FOR NONDESTRUCTIVE INSPECTION OF A VEHICLE

BACKGROUND OF THE INVENTION

This invention relates to the field of nondestructive testing. In particular, the invention concerns a method and apparatus for nondestructive testing of a vehicle, especially aircraft.

As an aircraft takes off, the pressure difference between the inside and the outside increases. When the aircraft reaches cruising altitude, the pressure inside the cabin may differ from the pressure outside by 6 psi or more. This pressure difference causes the radius of the fuselage of a typical commercial aircraft to increase by about one-eighth of an inch. Repeated takeoffs and landings cause the skin of the aircraft to stretch and contract many times. Such stretching can lead to metal fatigue, and can cause bonded joints in the fuselage to become unbonded. These conditions of unbonding often elude detection by conventional means. The prior art has known only relatively crude methods for detecting such defects.

The above problem has become especially acute because many commercial airlines have kept their aircraft in service long beyond the aircraft's anticipated economic life. With a large number of older aircraft in the skies, it becomes especially important to provide an accurate and economical means of nondestructively testing for structural defects.

The present invention includes a method and apparatus for economically testing aircraft and other vehicles for defects. In the preferred embodiment, the invention uses a real-time nondestructive testing device incorporating an electronic shearography camera. The method of the present invention applies stress to an aircraft which simulates the actual stress due to repeated expansions and contractions, and enables one to test for defects rapidly and with varying degrees of automation.

SUMMARY OF THE INVENTION

In its most general form, the invention includes a method of nondestructively testing a vehicle such as an aircraft. An interferometer, such as an electronic shearography camera, detects small deformations in the surface of the vehicle. One deforms the vehicle by pressurizing its interior, such as by forcing air into the cabin of an aircraft. A comparison of images of the vehicle surface, in the stressed and unstressed conditions, gives information about the integrity of the structure of the vehicle underlying the surface. One can stress the vehicle by varying the interior pressure slightly, upward or downward, around a known starting pressure, or by varying the pressure across a specific range, at a known rate.

One can place the camera on a tripod near the vehicle, or one can mount the camera in a hood which attaches to the vehicle surface.

In one embodiment, the hood has an open end which becomes closed off by a portion of the outer surface of the vehicle. The hood includes seals for engaging the surface of the vehicle and for creating a substantially airtight chamber within the hood. The hood includes the interferometer mounted inside. A source of coherent radiation emits radiation from within the hood towards the vehicle surface. The radiation may come from a laser mounted within the hood or located outside the hood. In the latter case, the laser light can arrive at the hood via a fiber optic cable. A vacuum hose connects the inside of the hood to a source of negative pressure. Thus, a vacuum inside the hood holds the hood firmly attached to the vehicle.

Alternatively, one can provide the hood with vacuum feet which attach to the vehicle surface. In this embodiment, the hood does not define an airtight chamber.

In both of the above embodiments, one can make the hood portable, so that an operator can position it at various locations on the vehicle surface.

One can use an electronic shearography apparatus as the interferometer, although one can practice the invention using other forms of interferometry.

The invention also includes various means of automating the testing of the vehicle. One can control the position of the interferometer with feedback from position sensors. A computer stores information about the structure of the vehicle. This information, combined with feedback giving the current position of the interferometer, enables the computer to direct the interferometer to a desired position. The computer therefore can automatically compile a list of potentially defective locations, as well as display them on a computer-generated defect map of the vehicle.

The present invention therefore has the primary object of providing a method and apparatus for nondestructive inspection of a vehicle.

The invention has the further object of providing an economical tool for nondestructive inspection of aircraft.

The invention has the further object of increasing the efficiency and accuracy of the nondestructive testing of a vehicle such as an aircraft.

The invention has the further object of providing a relatively light, hand-held apparatus for rapidly and reliably searching for defects in the fuselage of an aircraft or the like.

The invention has the further object of providing an apparatus as described above, which apparatus attaches by vacuum to the surface of the vehicle under inspection.

The invention also has the object of providing an apparatus and method for automating the nondestructive inspection of a vehicle such as an aircraft.

Persons skilled in the art will note other objects and advantages of the invention, from a reading of the following brief description of the drawings, the detailed description of the invention, and the appended claims.

DETAILED DESCRIPTION OF THE INVENTION

The present invention includes an apparatus and method for nondestructive inspection of a vehicle. This specification refers to aircraft by way of example, but one can also use the invention to inspect many other kinds of vehicles. The invention therefore includes inspection of vehicles and structures other than aircraft.

Figure 1:
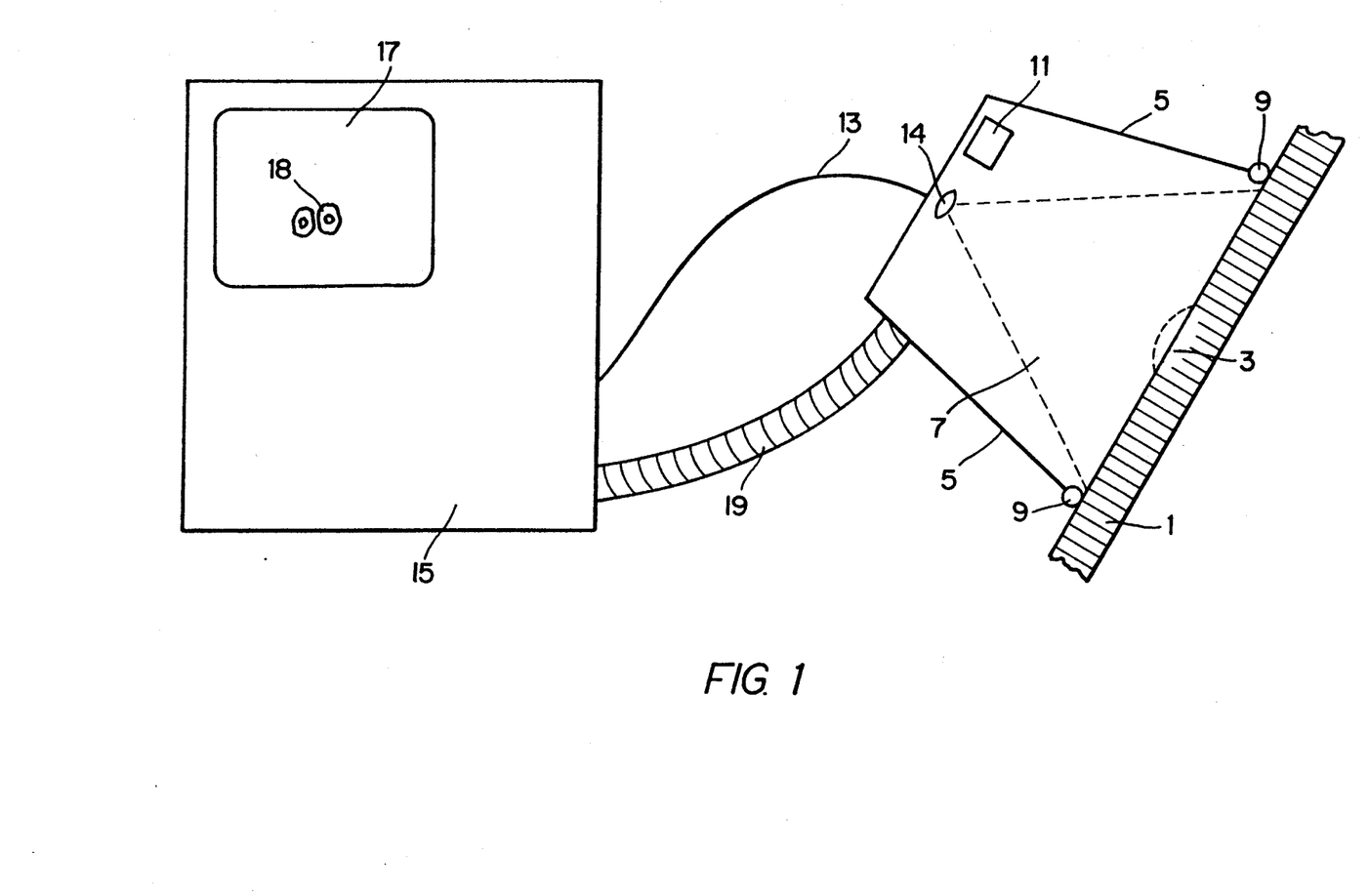
FIG. 1 shows one embodiment of the present invention, in schematic form, wherein a vacuum hood abuts the surface under analysis.

FIG. 1 shows, in schematic form, the basic features of one embodiment of the present invention. Composite structure 1 may take the form of an aircraft fuselage, or the body of another type of vehicle, or some other object. Reference numeral 3 indicates a hypothetical defect, such as a portion of structure 1 which has become unbonded. The apparatus includes hood 5, which, together with the surface of structure 1, defines an enclosed chamber 7. Seal 9 seals the chamber against structure 1, and makes the chamber substantially airtight.

The apparatus also includes an interferometer, at least a portion of which preferably resides within the hood. In particular, the interferometer may include camera 11 for recording interferograms. In the preferred embodiment, the camera comprises an electronic shearography camera, but one can practice the invention with other types of interferometry (such as holography).

A source of coherent light, if located outside the hood, illuminates the composite structure via fiber optic cable 13. Lens 14 expands the beam of coherent light inside the hood. One can also place the coherent light source entirely within the hood. One could even place some or most of the body of the camera outside the hood, as long as one provides an unobstructed optical path from the camera to the vehicle surface.

FIG. 1 also shows control unit 15, which may include a computer for storing and electronically processing images, and a video monitor 17 for viewing the results of the analysis in "real time". Monitor 17 shows hypothetical fringes 18, representing the defect on the vehicle surface.

Vacuum hose 19 draws air from chamber 7, under the control of a suitable pump (not shown) located within control unit 15, or located elsewhere. The hose creates a vacuum in the chamber, thus insuring that the hood remains firmly attached to structure 1 during the test. The vacuum in the chamber does not normally participate appreciably in stressing the surface of the vehicle. However, for certain structures, especially relatively small and stiff structures, such as an aircraft wing, one may use the vacuum in the hood to provide some or all of the stress.

One preferably uses electronic shearography as the interferometric technique. U.S. Pat. Nos. 4,887,899 and 5,094,528 describe devices and methods for performing electronic shearography. This specification hereby incorporates by reference the disclosures of the above-cited patents. Thus, one can make the camera 11, and its associated components, according to the teachings of the above patents. One can also use other means of interferometry. One should preferably use a real-time system, in order to provide immediate results to the operator. Electronic shearography has a great advantage over other techniques, such as real-time holography, because small vibrations in the system do not affect the accuracy of the test.

Figure 2:
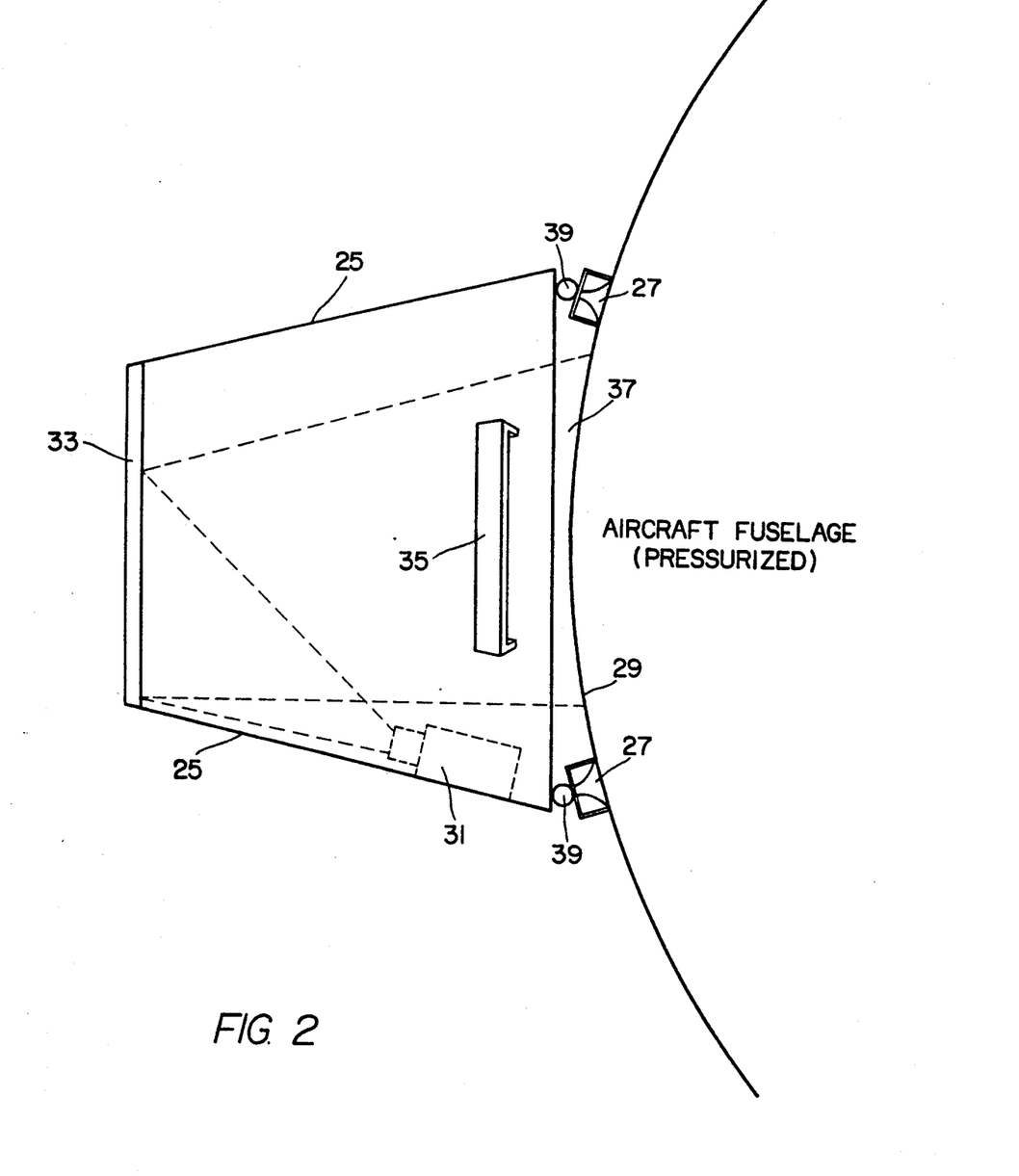
FIG. 2 provides a schematic diagram of an alternative embodiment, wherein the hood attaches to the vehicle with vacuum feet.

FIG. 2 shows an alternative embodiment. In this embodiment, hood 25 rests on vacuum feet 27. FIG. 2 explicitly shows the test object as an aircraft fuselage 29. The hood includes interferometry camera 31 mounted within it. If the camera does not point directly at the test surface, as shown in FIG. 2, one can redirect the light with a suitable optical system, which may include elements such as mirror 33. One can also provide one or more handles 35 on the exterior of hood 25, to enable the operator to carry the hood by hand. The hood of FIG. 1 may also include similar handles.

Both of the embodiments of FIGS. 1 and 2 can have the laser inside the hood or outside the hood. If the laser sits outside the hood, one brings the laser light inside with a fiber optic cable, as shown in FIG. 1.

In the embodiment of FIG. 2, the hood and fuselage define a relatively wide clearance 37; as shown in FIG. 2, the hood does not even touch the fuselage. In this embodiment, the interior of the hood defines a light-tight but not airtight chamber. One prevents light from leaving the chamber by filling the clearance with a suitable opaque material, such as felt (not shown). For reasons of safety, one may prevent laser light from leaving the chamber, because laser light could harm the operator's eyes. But in the embodiment of FIG. 2, one does not need to maintain a vacuum in the chamber because the vacuum feet suffice to hold the hood affixed to the fuselage.

The embodiment of FIG. 2 has the advantage that the hood can easily attach firmly to surfaces of varying shapes. Pivots 39 of the vacuum feet enable the feet to rotate, thus accommodating many possible surface contours. The embodiment of FIG. 2 also has the advantage that it tends not to pull substantial quantities of dirt and dust into the chamber. By comparison, in the device of FIG. 1, the vacuum inside the chamber pulls dust inside, which then accumulates on the camera (and on any mirror(s) located within the chamber). The device of FIG. 1 therefore requires more frequent cleaning than that of FIG. 2. Also, the vacuum feet of FIG. 2 require a less powerful vacuum source than that provided in FIG. 1.

Figure 3A:
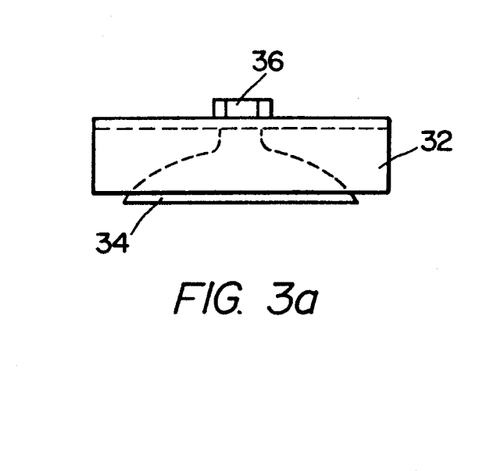
FIGS. 3a, 3b, and 3c illustrate, in more detail, in a front view and two end views, the vacuum feet used in the embodiment of FIG. 2.
Figure 3B:
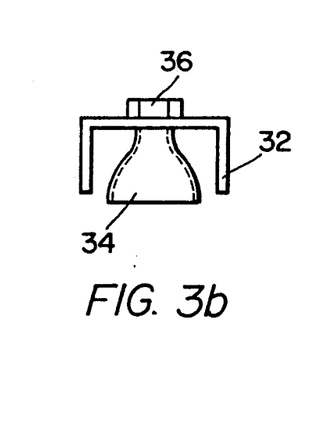
Figure 3C:
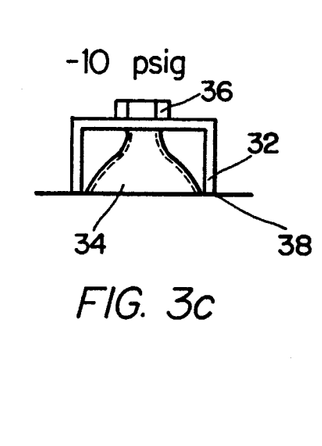

FIGS. 3a, 3b, and 3c illustrate one possible structure for the vacuum feet of FIG. 2. FIG. 3a provides a front view, and FIGS. 3b and 3c provide end views. Each vacuum foot includes U-shaped channel 32, preferably made of metal or other rigid material, and rubber vacuum cup 34. The metal channel stabilizes the vacuum foot on the surface of the vehicle, and also supports the hood. The vacuum foot includes attachment 36 for connection to a pivot joint (shown schematically in FIG. 2) and to a vacuum supply line (not shown). FIG. 3b represents the vacuum foot before the application of a vacuum; FIG. 3c shows the same vacuum foot after the application of a vacuum (shown as −10 psig, as an example, in FIG. 3c). The application of the vacuum pulls the vacuum cup towards the channel, thereby urging the channel and vehicle surface 38 together. Each vacuum foot connects to a similar vacuum supply line, so that one can attach all of the vacuum feet to surface 38 in the same way.

The arrangement of FIGS. 3a–3c represents the preferred way to construct the vacuum feet. One may attach the feet in other ways, and one should not consider the present invention limited to this particular structure.

One can, in general, hold the devices of both FIGS. 1 and 2 by hand, such as by handle 35. Alternatively, when inspecting very large aircraft, one can use the arrangement shown in FIG. 4. Crane 43 extends from inspection truck 45, and holds hood 41 against fuselage 47. Hose 49 conveys air into (or out of) the interior of the fuselage. A pump (not shown) located in truck 45 provides the positive or negative pressure.

In the present invention, when one stresses the test vehicle with pressure, one preferably pressurizes the interior of the vehicle and determines, by interferometry, the resulting strain in the vehicle surface. When one pressurizes the interior of an aircraft, and then changes the pressure slightly, one induces a stress concentration in unbonded areas of the fuselage. The shearography camera (or other interferometric device) can detect such unbonded areas. An aircraft fuselage typically includes areas which contain two layers of metal bonded together, to provide extra stiffness where needed. If these layers, or "skins", become unbonded, the the fuselage deforms under pressure as if only one skin exists. The shearography camera detects such "single skin" deformations.

Note that one does not normally use the vacuum in the hood (as generated in the embodiment of FIG. 1) to stress the vehicle. The vacuum inside the hood provides only localized stress, and this vacuum does not suffice to deform the entire fuselage. However, when inspecting certain smaller (and stiffer) structures, such as an aircraft wing, one can use the vacuum in the hood to apply stress. In many cases, one can more easily perform tests on a relatively stiff structure than a soft structure, because the stiffer structure does not deform excessively so as to give meaningless test results, but still deforms enough to provide useful information.

In practice, one pressurizes the interior of an aircraft by using its external air conditioning port, and a standard blower truck. One uses such trucks, in the prior art, for providing air to an aircraft on the ground, at a terminal. One should increase the pressure to approximately +2 psig, so as to seal the door pressure seals to make the aircraft airtight. Then, one can increase or decrease the pressure slightly in performing the tests. For a shearography camera in which the angle of shearing equals about $(\frac{1}{2})°$, experience shows that a pressure change of 0.05 psi works best. In an alternative method, one can slowly build the pressure (for example, at the rate of 0.05 psi every 6 seconds) to a maximum level, and can then reduce the pressure at the same rate, allowing the operator to inspect an area in six seconds. The latter alternative has the disadvantage that it creates higher pressures in the aircraft, further fatiguing the vehicle and possibly endangering personnel outside the aircraft, due to the risk that the fuselage may burst under pressure. This specification gives the above-mentioned values of pressure by way of example only, and not to limit the invention in any way.

One can use a computer to control the test, and one can perform the test with varying levels of automation. In one embodiment, the operator manually places the hood over the area of interest. The hood becomes attached to the surface of the aircraft, by vacuum, either due to evacuation of the interior of the hood (FIG. 1) or by application of vacuum to the vacuum feet (FIG. 2). One can provide an automatic means for unshuttering the laser upon vacuum attachment of the hood. The shearography camera then generates a reference image of the surface, and the computer, connected to the camera, stores this image. Then, one stresses the aircraft structure with a slight pressure change, by operating a control valve at an external air conditioning port or by other means, and with the computer monitoring the internal pressure with a sensor inside the vehicle, and the camera then generates another image of the surface. The computer stores the second image also, and performs a comparison of the images electronically, as described more fully in U.S. Pat. No. 4,887,899. This entire inspection process may take about 1-10 seconds.

The compared image, generated by the computer, provides a graphic indication of the changes in strain that occurred in the surface with the specific stress applied. The operator can see directly, on a video monitor connected to the computer, the locations of defects in the internal structure of the fuselage. The image on the monitor would directly show unbonded areas as areas of weakened structure, identifiable as areas containing an excess of interference fringes. If one stresses the fuselage with the proper amount of pressure, one should observe no fringes in areas having a double layer of metal. In areas where the fuselage contains only a single layer, one expects to observe some fringes, because the single layer deforms more readily under pressure than a double layer.

The shearographic image will also reveal the location of loose rivets. One can also use the same method to locate hidden skin cracks, by reducing the field of view and possibly by using more pressure change.

Figure 4:
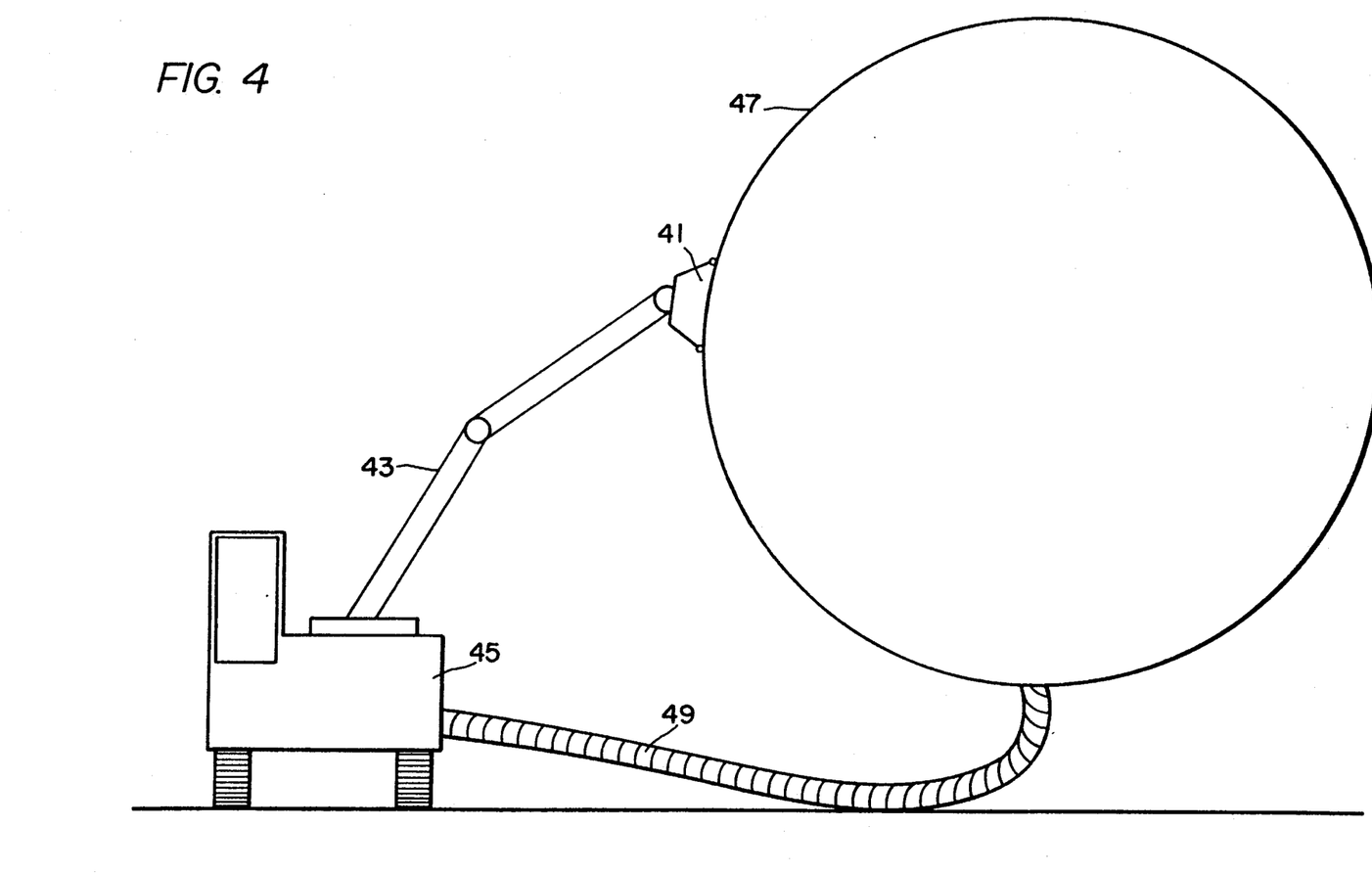
FIG. 4 provides another schematic diagram showing the use of the present invention in nondestructively testing the fuselage of a large aircraft.

Alternatively, the arrangement of FIG. 4, discussed above, permits inspection of substantially the entire surface of the fuselage. One can use the arrangement of FIG. 4 in a more automated version of the invention discussed below, and illustrated in FIG. 5.

Figure 5:
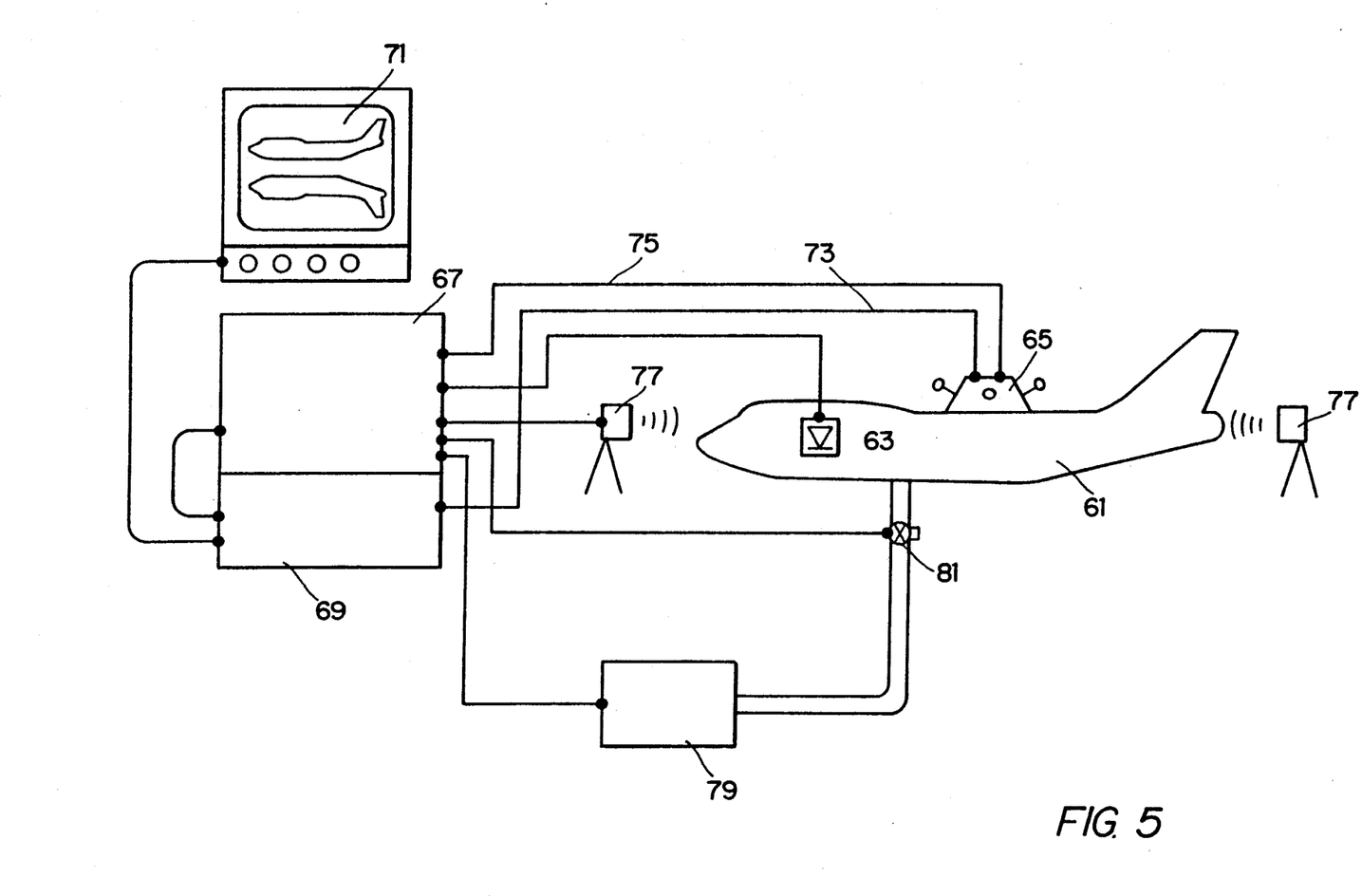
FIG. 5 illustrates, in a schematic diagram, the arrangement of components in a system made according to the present invention.

FIG. 5 shows an arrangement for fully automating the inspection process. Aircraft 61 includes pressure sensor 63 disposed within the aircraft. Inspection hood 65 attaches to the aircraft in any of the ways discussed above. FIG. 5 does not explicitly show the means of moving the hood over the surface of the fuselage, but one can use the arrangement of FIG. 4, or its equivalent, for this purpose. One should consider FIGS. 4 and 5 as consistent with each other. Blower 79 pressurizes the interior of the aircraft, through three-way valve 81.

Computer 67 controls the testing. Line 73 conveys the video signal from the camera (not shown in FIG. 5) to the computer. Image processor 69 stores frames of video information, and performs the comparisons discussed above and in U.S. Pat. No. 4,887,899. One can form the computer and image processor as one unit. The output of the image processor appears on display monitor 71.

Computer 67 also receives a signal from pressure sensor 63, and connects to the blower and to the valve. Thus, computer 67 can control the blower and the valve in response to a signal from the pressure sensor. Thus, the computer can exercise full control over the pressure in the aircraft.

Line 75 connects tilt sensors (not shown) located at the hood, to the computer. Ultrasonic transmitters 77 direct ultrasonic signals to a receiver (not shown) in the hood. One can connect the output of the receiver to the computer through another line (not shown) or by multiplexing the signal on the tilt meter line. For simplicity of illustration, FIG. 5 shows no explicit connection between the transmitter on the right-hand side and the computer, but one can provide such a connection. Through the output of the sensors, and the ultrasonic transmitters, the computer can determine the exact position of the hood on the aircraft. The computer can then control a suitable apparatus, such as crane 43 of FIG. 4, and move the hood to a desired, known location. Thus, not only can one automatically control the position of the hood on the fuselage, but one can also store the location of defects found. One can also link the computer to an expert system for automatic analysis of the results. Since the computer can store information on the structure of the vehicle, the computer "knows" which portions of the surface have single layers and which portions have double layers of metal. Therefore, if a portion of the surface known to have a double layer exhibits excessive fringes, the system concludes that that portion has a defect.

Note also that although the interferometry camera obtains an image of the outer surface of the vehicle, the test results actually provide information on the structural integrity of the region behind the surface. With the present invention, one thus obtains information on hidden defects, which one cannot see simply by looking at the outside surface of the vehicle.

If one attaches the hood using the embodiment of FIG. 2 (having the vacuum feet), one preferably uses at least three such feet, to stabilize the hood on the surface of the aircraft. FIG. 2 shows only two feet for simplicity of illustration. Also, one can increase the width of the feet to spread the load over a greater area, while stressing the fuselage material by the least amount. The weight of the hood, which hangs from the fuselage, can affect the test, and spreading the weight minimizes this effect. Wide feet also provide greater stability on a flexible or variably distorting structure, such as an aircraft fuselage.

In the embodiment having the vacuum feet, one can modify the structure of the hood considerably, provided that the sides of the hood minimize the external illumination of the structure under inspection, to minimize the exposure of personnel to laser light.

The apparatus preferably includes an interlock switch (not shown) which allows the laser to turn on (become unshuttered) only during the inspection, with the hood attached to the vehicle. Also, one can include a vacuum sensor which permits the laser to operate only when the sensor detects a vacuum. In the latter case, the laser cannot operate until the apparatus has created the vacuum inside the hood, or inside the vacuum feet.

The present invention also includes other variations. One can simply mount the camera or other image generator on a tripod, near the aircraft. The latter technique has the disadvantages that vibration and movement of the relatively large aircraft can mar the test results. Also, vacuum attachment of the hood to the vehicle surface provides a more stable inspection platform, due to the direct attachment of the hood to the area of inspection. Also, if one uses a small CCD camera and a small laser within the hood, or alternatively a large laser external to the hood connected by a fiber optic cable, one can carry the apparatus of the present invention by hand. Also, in the case of a large commercial aircraft, using a tripod limits the inspection to approximately the lower third of the aircraft, unless one provides an extensive scaffolding arrangement.

On the other hand, the tripod eliminates the need to provide a vacuum hood or vacuum feet. Thus, one may prefer the tripod in certain circumstances. Note also that one can use the arrangement of FIG. 5 with a tripod. In other words, one can control the position of the camera on the tripod, using feedback from sensors as shown in FIG. 5.

One can therefore modify the above-described invention in many ways. One should consider such modifications within the spirit and scope of the following claims.

We claim:

1. Apparatus for nondestructive inspection of a vehicle, the apparatus comprising:
   a) means defining a hood, the hood having an open end, the open end being closable by placement of the hood against an outside surface of the vehicle,
   b) a source of coherent radiation disposed to emit said radiation from inside the hood towards the surface of the vehicle,
   c) an interferometer mounted within the hood and disposed to receive radiation reflected from the surface of the vehicle, and
   d) means for varying the pressure within the hood when the hood is positioned against the surface of the vehicle.

2. The apparatus of claim 1, wherein the hood includes seals positioned to abut the surface of the vehicle when the hood is positioned against the vehicle surface.

3. The apparatus of claim 1, wherein the hood defines an inside region, and wherein the source of coherent radiation comprises a laser disposed outside of the hood, and a fiber optic cable connected to direct light from the laser to the inside region of the hood.

4. The apparatus of claim 1, wherein the interferometer includes a shearography camera.

5. The apparatus of claim 1, wherein the interferometer comprises means for performing electronic shearography.

6. The apparatus of claim 1, wherein the pressure varying means comprises means for creating a partial vacuum inside the hood when the hood abuts the surface of the vehicle.

7. The apparatus of claim 2, wherein the seals comprise vacuum feet.

8. In combination, an aircraft, the aircraft having a fuselage, and the apparatus of claim 1, wherein the hood is positioned against the fuselage.

9. A method of inspecting a vehicle, the vehicle including an outer surface, the method comprising the steps of:
   a) placing a hood over a portion of the outer surface of the vehicle, the hood having an open end, wherein the hood and the surface of the vehicle together define a chamber, the hood including means, disposed within the hood, for generating an interferogram,
   b) obtaining a first interferogram of the portion of the vehicle surface, while the surface is in an unperturbed state,
   c) perturbing said portion of the vehicle surface,
   d) obtaining a second interferogram of said portion of the vehicle surface, and
   e) comparing said first and second interferograms.

10. The method of claim 9, wherein the interferograms are obtained by electronic shearography.

11. The method of claim 9, wherein the vehicle includes a closed region, and wherein the perturbing step comprises the step of varying the pressure within said region.

12. The method of claim 9, further comprising the step of moving the hood to another portion of the surface of the vehicle, and repeating steps (b) through (e).

13. The method of claim 9, wherein the hood can be held by hand, and wherein step (a) is performed by manually positioning the hood over a portion of the outer surface of the vehicle.

14. The method of claim 9, wherein the hood forms a closed chamber with said vehicle surface, and wherein step (b) is preceded by the step of creating a vacuum in said chamber so as to make the chamber substantially airtight.

15. The method of claim 9, wherein the hood is attached to the vehicle surface by a plurality of vacuum feet, wherein the hood itself does not contact the surface.

16. A method of nondestructively inspecting a vehicle, the vehicle including a closed interior region and an outer surface, the method comprising the steps of:
 a) obtaining a first interferometric image of a portion of the outer surface of the vehicle while the vehicle is in an unstressed condition,
 b) stressing the vehicle by varying the pressure in said interior region of the vehicle,
 c) obtaining a second interferometric image of the same portion of the outer surface while the vehicle is in the stressed condition, and
 d) comparing the first and second images to derive information on the integrity of the vehicle structure located behind the surface being examined.

17. The method of claim 16, wherein the interferometric images are obtained with a hand-held interferometer, and wherein step (a) is preceded by the step of attaching the interferometer to the vehicle surface.

18. The method of claim 17, wherein the attaching step comprises attaching the interferometer to the surface by means of a vacuum.

19. The method of claim 16, wherein the interferometer comprises means for performing electronic shearography.

20. The method of claim 16, wherein the stressing step comprises the step of varying the pressure in said interior region by slight positive and negative changes, about a set pressure, and wherein step (c) is repeated for each pressure change.

21. The method of claim 16, wherein the stressing step comprises the step of slowly increasing or decreasing the pressure between two limits, and wherein step (c) is performed repeatedly as the pressure is changed.

22. The method of claim 16, wherein all steps are controlled automatically by a computer.

23. The method of claim 16, wherein the interferometric images are obtained from an interferometer pointed at said portion of the vehicle surface, and wherein the method further comprises the steps of automatically determining the position of the interferometer, and automatically moving the interferometer to a new position after step (d) is completed, and repeating steps (a) through (d) for said new position.

24. The method of claim 23, wherein the step of automatically determining position is performed by at least one ultrasonic position sensor to locate the position of the interferometer along the length of the vehicle.

25. The method of claim 23, wherein the step of automatically determining position is performed by a tilt sensor provided in the interferometer, wherein the tilt sensor comprises means for determining the radial position of the interferometer on the vehicle surface.

26. The method of claim 23, wherein the automatic position determining and automatic moving steps are performed under the control of a computer, wherein the computer has a memory in which information on the structure of the vehicle is stored, and wherein the method further comprises the step of positioning the interferometer in accordance with said stored information.

27. The method of claim 26, wherein the comparing step comprises the step of generating a composite pattern based on said first and second interferometric images, and wherein the method further comprises the step of automatically analyzing each such composite pattern to detect the presence of fringes.

28. The method of claim 27, wherein the analyzing step includes the step of determining the location of each defect in the vehicle by relating the presence of fringes to a physical location on the vehicle in accordance with the stored information on vehicle structure.

29. Apparatus for nondestructively inspecting a vehicle, the vehicle including a closed interior region and an outer surface, the apparatus comprising:
 a) an interferometer positioned to obtain interferometric images of a portion of the outer surface of the vehicle,
 b) means for stressing the vehicle by varying the pressure in said interior region of the vehicle, and
 c) electronic means for comparing the interferometric images obtained by the interferometer.

30. The apparatus of claim 29, further comprising means for automatically determining the position of the interferometer relative to the vehicle.

31. The apparatus of claim 29, wherein the stressing means comprises a blower connected to a vent in the vehicle, the blower comprising means for directing air into said interior region.

32. The apparatus of claim 29, wherein the interferometer is a hand-held unit which is vacuum attached to the surface of the vehicle.

* * * * *